US010711600B2

(12) United States Patent
Walker et al.

(10) Patent No.: US 10,711,600 B2
(45) Date of Patent: Jul. 14, 2020

(54) METHODS OF NETWORK PEER IDENTIFICATION AND SELF-ORGANIZATION USING UNIQUE TONAL SIGNATURES AND WELLS THAT USE THE METHODS

(71) Applicants: Katie M. Walker, Spring, TX (US); Scott William Clawson, Califon, NJ (US)

(72) Inventors: Katie M. Walker, Spring, TX (US); Scott William Clawson, Califon, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 45 days.

(21) Appl. No.: 16/267,950

(22) Filed: Feb. 5, 2019

(65) Prior Publication Data

US 2019/0242249 A1 Aug. 8, 2019

Related U.S. Application Data

(60) Provisional application No. 62/799,881, filed on Feb. 1, 2019, provisional application No. 62/628,105, filed on Feb. 8, 2018.

(51) Int. Cl.
*E21B 47/14* (2006.01)
*H04W 24/02* (2009.01)
(Continued)

(52) U.S. Cl.
CPC .............. *E21B 47/14* (2013.01); *H04B 11/00* (2013.01); *H04W 24/02* (2013.01); *H04W 76/10* (2018.02)

(58) Field of Classification Search
CPC ........ E21B 47/14; H04B 11/00; H04W 24/02; H04W 76/10
See application file for complete search history.

(56) References Cited

U.S. PATENT DOCUMENTS

| 3,103,643 A | 9/1963 | Kalbfell ........................ 340/17 |
| 3,205,477 A | 9/1965 | Kalbfell ........................ 340/18 |

(Continued)

FOREIGN PATENT DOCUMENTS

| CN | 102733799 | 6/2014 | ............ E21B 47/16 |
| EP | 0636763 | 2/1995 | ............ E21B 47/12 |

(Continued)

OTHER PUBLICATIONS

U.S. Appl. No. 15/666,334, filed Aug. 1, 2017, Walker, Katie M. et al.

(Continued)

*Primary Examiner* — Omer S Khan
(74) *Attorney, Agent, or Firm* — ExxonMobil Upstream Research Company—Law Department

(57) ABSTRACT

A method of communication using a wireless network is disclosed. A wireless transmission of a signal is received at a first node. The signal has a frequency signature. The frequency signature of the received signal is compared with a frequency signature of a previously received signal from a second node. If it is determined that the frequency signature of the received signal and the frequency signature of the previously received signal are within a predetermined range of similarity, the received signal and the previously received signal are accepted as having been transmitted by the second node.

18 Claims, 9 Drawing Sheets

(51) Int. Cl.
*H04W 76/10* (2018.01)
*H04B 11/00* (2006.01)

(56) References Cited

U.S. PATENT DOCUMENTS

| | | |
|---|---|---|
| 3,512,407 A | 5/1970 | Zill .............................. 73/152 |
| 3,637,010 A | 1/1972 | Malay et al. .................. 166/51 |
| 3,741,301 A | 6/1973 | Malay et al. ................. 166/191 |
| 3,781,783 A | 12/1973 | Tucker ........................... 340/18 |
| 3,790,930 A | 2/1974 | Lamel et al. ................... 340/18 |
| 3,900,827 A | 8/1975 | Lamel et al. ................... 340/18 |
| 3,906,434 A | 9/1975 | Lamel et al. ................... 340/18 |
| 4,001,773 A | 1/1977 | Lamel et al. ................... 340/18 |
| 4,283,780 A | 8/1981 | Nardi ............................. 367/151 |
| 4,298,970 A | 11/1981 | Shawhan et al. .............. 367/82 |
| 4,302,826 A | 11/1981 | Kent et al. ..................... 367/82 |
| 4,314,365 A | 2/1982 | Petersen et al. ............... 367/82 |
| 4,884,071 A | 11/1989 | Howard ......................... 340/854 |
| 4,962,489 A | 10/1990 | Medlin et al. .................. 367/32 |
| 5,128,901 A | 7/1992 | Drumheller .................... 367/82 |
| 5,136,613 A | 8/1992 | Dumestre, III ................. 375/1 |
| 5,166,908 A | 11/1992 | Montgomery ................. 367/165 |
| 5,182,946 A | 2/1993 | Boughner et al. ............. 73/151 |
| 5,234,055 A | 8/1993 | Cornette ........................ 166/278 |
| 5,283,768 A | 2/1994 | Rorden ........................... 367/83 |
| 5,373,481 A | 12/1994 | Orban et al. ................... 367/82 |
| 5,468,025 A | 11/1995 | Adinolfe et al. ............... 285/114 |
| 5,480,201 A | 1/1996 | Mercer ........................... 294/67.31 |
| 5,495,230 A | 2/1996 | Lian ............................... 340/551 |
| 5,562,240 A | 10/1996 | Campbell ....................... 227/130 |
| 5,592,438 A | 1/1997 | Rorden et al. .................. 367/83 |
| 5,667,650 A | 9/1997 | Face et al. ..................... 204/298.07 |
| 5,850,369 A | 12/1998 | Rorden et al. .................. 367/83 |
| 5,857,146 A | 1/1999 | Kido ............................... 455/38.3 |
| 5,924,499 A | 7/1999 | Birchak et al. ................ 175/40 |
| 5,960,883 A | 10/1999 | Tubel et al. .................... 166/313 |
| 5,995,449 A | 11/1999 | Green et al. .................... 367/83 |
| 6,049,508 A | 4/2000 | Deflandre ....................... 367/48 |
| 6,125,080 A | 9/2000 | Sonnenschein et al. ...... 367/134 |
| 6,128,250 A | 10/2000 | Reid et al. ...................... 367/153 |
| 6,177,882 B1 | 1/2001 | Ringgenberg et al. ..... 340/853.7 |
| 6,236,850 B1 | 5/2001 | Desai ............................. 455/343 |
| 6,239,690 B1 | 5/2001 | Burbidge et al. ............. 340/10.33 |
| 6,300,743 B1 | 10/2001 | Patino et al. .................. 320/106 |
| 6,320,820 B1 | 11/2001 | Gardner et al. ................ 367/81 |
| 6,324,904 B1 | 12/2001 | Ishikawa et al. ............. 73/152.03 |
| 6,360,769 B1 | 3/2002 | Brisco ............................ 137/268 |
| 6,394,184 B2 | 5/2002 | Tolman et al. ................ 166/281 |
| 6,400,646 B1 | 6/2002 | Shah et al. ..................... 367/82 |
| 6,429,784 B1 | 8/2002 | Beique et al. ................. 340/853.2 |
| 6,462,672 B1 | 10/2002 | Besson .......................... 340/853.2 |
| 6,543,538 B2 | 4/2003 | Tolman et al. ................ 166/284 |
| 6,670,880 B1 | 12/2003 | Hall et al. ...................... 336/132 |
| 6,679,332 B2 | 1/2004 | Vinegar et al. ................ 166/373 |
| 6,695,277 B1 | 2/2004 | Gallis ............................. 241/191 |
| 6,702,019 B2 | 3/2004 | Dusterhoft et al. ........... 166/278 |
| 6,717,501 B2 | 4/2004 | Hall et al. ...................... 336/132 |
| 6,727,827 B1 | 4/2004 | Edwards et al. .............. 340/854.9 |
| 6,772,837 B2 | 8/2004 | Dusterhoft et al. ........... 166/278 |
| 6,816,082 B1 | 11/2004 | Laborde ......................... 340/853.3 |
| 6,868,037 B2 | 3/2005 | Dasgupta et al. .............. 367/54 |
| 6,880,634 B2 | 4/2005 | Gardner et al. ........... 166/250.01 |
| 6,883,608 B2 | 4/2005 | Parlar et al. ................... 166/278 |
| 6,899,178 B2 | 5/2005 | Tubel .............................. 166/313 |
| 6,909,667 B2 | 6/2005 | Shah et al. ..................... 367/83 |
| 6,912,177 B2 | 6/2005 | Smith ............................. 367/82 |
| 6,920,085 B2 | 7/2005 | Finke et al. .................... 367/83 |
| 6,930,616 B2 | 8/2005 | Tang et al. ..................... 340/854.4 |
| 6,940,392 B2 | 9/2005 | Chan et al. ..................... 340/10.4 |
| 6,940,420 B2 | 9/2005 | Jenkins ........................... 340/855.6 |
| 6,953,094 B2 | 10/2005 | Ross et al. ...................... 166/381 |
| 6,956,791 B2 | 10/2005 | Dopf et al. ..................... 367/82 |
| 6,980,929 B2 | 12/2005 | Aronstam et al. ............. 702/188 |
| 6,987,463 B2 | 1/2006 | Beique et al. ................. 340/856.3 |
| 7,006,918 B2 | 2/2006 | Economides et al. .......... 702/1 |
| 7,011,157 B2 | 3/2006 | Costley et al. ................. 166/311 |
| 7,036,601 B2 | 5/2006 | Berg et al. ...................... 166/385 |
| 7,051,812 B2 | 5/2006 | McKee et al. ................. 166/305.1 |
| 7,064,676 B2 | 6/2006 | Hall et al. ...................... 350/853.1 |
| 7,082,993 B2 | 8/2006 | Ayoub et al. .................. 166/250.1 |
| 7,090,020 B2 | 8/2006 | Hill et al. ....................... 166/373 |
| 7,140,434 B2 | 11/2006 | Chouzenoux et al. ..... 166/250.11 |
| 7,219,762 B2 | 5/2007 | James et al. ................... 181/105 |
| 7,224,288 B2 | 5/2007 | Hall et al. ...................... 340/853.7 |
| 7,228,902 B2 | 6/2007 | Oppelt ....................... 166/250.02 |
| 7,249,636 B2 | 7/2007 | Ohmer ........................... 166/383 |
| 7,252,152 B2 | 8/2007 | LoGiudice et al. ........... 166/386 |
| 7,257,050 B2 | 8/2007 | Stewart et al. ................. 367/82 |
| 7,261,154 B2 | 8/2007 | Hall et al. ...................... 166/242.2 |
| 7,261,162 B2 | 8/2007 | Deans et al. ................... 166/336 |
| 7,275,597 B2 | 10/2007 | Hall et al. ...................... 166/297 |
| 7,277,026 B2 | 10/2007 | Hall et al. ...................... 340/854.8 |
| RE40,032 E | 1/2008 | van Bokhorst et al. .... 455/343.2 |
| 7,317,990 B2 | 1/2008 | Sinha et al. .................... 702/6 |
| 7,321,788 B2 | 1/2008 | Addy et al. .................... 455/574 |
| 7,322,416 B2 | 1/2008 | Burris, II et al. ........... 166/308.1 |
| 7,325,605 B2 | 2/2008 | Fripp et al. ................ 166/250.01 |
| 7,339,494 B2 | 3/2008 | Shah et al. ..................... 340/855.7 |
| 7,348,893 B2 | 3/2008 | Huang et al. .................. 340/854.3 |
| 7,385,523 B2 | 6/2008 | Thomeer et al. ............. 340/854.8 |
| 7,387,165 B2 | 6/2008 | Lopez de Cardenas et al. ........... 166/313 |
| 7,411,517 B2 | 8/2008 | Flanagan ....................... 340/854.4 |
| 7,477,160 B2 | 1/2009 | Lemenager et al. ......... 340/853.1 |
| 7,516,792 B2 | 4/2009 | Lonnes et al. ............. 166/308.1 |
| 7,551,057 B2 | 6/2009 | King et al. ..................... 340/5.72 |
| 7,590,029 B2 | 9/2009 | Tingley ........................... 367/82 |
| 7,595,737 B2 | 9/2009 | Fink et al. ...................... 340/854.4 |
| 7,602,668 B2 | 10/2009 | Liang et al. .................... 367/25 |
| 7,649,473 B2 | 1/2010 | Johnson et al. ................ 340/853.1 |
| 7,750,808 B2 | 7/2010 | Masino et al. ................. 340/572.1 |
| 7,775,279 B2 | 8/2010 | Marya et al. .................. 166/297 |
| 7,787,327 B2 | 8/2010 | Tang et al. ...................... 367/27 |
| 7,819,188 B2 | 10/2010 | Auzerais et al. .............. 155/250 |
| 7,828,079 B2 | 11/2010 | Oothoudt ........................ 175/20 |
| 7,831,283 B2 | 11/2010 | Ogushi et al. ................. 455/574 |
| 7,913,773 B2 | 3/2011 | Li et al. .......................... 175/40 |
| 7,952,487 B2 | 5/2011 | Montebovi .................... 340/636.1 |
| 7,994,932 B2 | 8/2011 | Huang et al. .................. 340/854.3 |
| 8,004,421 B2 | 8/2011 | Clark ............................. 340/854.4 |
| 8,044,821 B2 | 10/2011 | Mehta ............................ 340/855.7 |
| 8,049,506 B2 | 11/2011 | Lazarev ......................... 324/333 |
| 8,115,651 B2 | 2/2012 | Camwell et al. ............. 340/853.2 |
| 8,117,907 B2 | 2/2012 | Han et al. ...................... 73/152.58 |
| 8,157,008 B2 | 4/2012 | Lilley ............................. 166/253.1 |
| 8,162,050 B2 | 4/2012 | Roddy et al. .................. 166/253.1 |
| 8,220,542 B2 | 7/2012 | Whitsitt et al. ................ 166/278 |
| 8,237,585 B2 | 8/2012 | Zimmerman .................. 340/854.6 |
| 8,242,928 B2 | 8/2012 | Prammer ....................... 340/853.7 |
| 8,276,674 B2 | 10/2012 | Lopez de Cardenas et al. ........... 166/373 |
| 8,284,075 B2 | 10/2012 | Fincher et al. ................ 340/854.4 |
| 8,284,947 B2 | 10/2012 | Giesbrecht et al. ............. 381/66 |
| 8,316,936 B2 | 11/2012 | Roddy et al. .................. 166/253.1 |
| 8,330,617 B2 | 12/2012 | Chen et al. ..................... 340/854.6 |
| 8,347,982 B2 | 1/2013 | Hannegan et al. .............. 175/5 |
| 8,358,220 B2 | 1/2013 | Savage .......................... 340/853.1 |
| 8,376,065 B2 | 2/2013 | Teodorescu et al. ............ 175/40 |
| 8,381,822 B2 | 2/2013 | Hales et al. .................... 166/377 |
| 8,388,899 B2 | 3/2013 | Mitani et al. .................. 422/179 |
| 8,411,530 B2 | 4/2013 | Slocum et al. ................. 367/90 |
| 8,434,354 B2 | 5/2013 | Crow et al. .................... 73/152.04 |
| 8,494,070 B2 | 7/2013 | Luo et al. ....................... 375/262 |
| 8,496,055 B2 | 7/2013 | Mootoo et al. ................ 166/278 |
| 8,539,890 B2 | 9/2013 | Tripp et al. ...................... 109/25 |
| 8,544,564 B2 | 10/2013 | Moore et al. ..................... 175/50 |
| 8,552,597 B2 | 10/2013 | Song et al. ..................... 307/149 |
| 8,556,302 B2 | 10/2013 | Dole .............................. 285/367 |
| 8,559,272 B2 | 10/2013 | Wang | 
| 8,596,359 B2 | 12/2013 | Grigsby et al. ................ 166/278 |
| 8,605,548 B2 | 12/2013 | Froelich ......................... 367/82 |
| 8,607,864 B2 | 12/2013 | Mcleod et al. ................ 166/250.1 |
| 8,664,958 B2 | 3/2014 | Simon ............................ 324/338 |
| 8,672,875 B2 | 3/2014 | Vanderveen et al. ............ 604/67 |

(56) References Cited

U.S. PATENT DOCUMENTS

| | | |
|---|---|---|
| 8,675,779 B2 | 3/2014 | Zeppetelle et al. ............ 375/340 |
| 8,683,859 B2 | 4/2014 | Godager .................... 73/152.54 |
| 8,689,621 B2 | 4/2014 | Godager .................... 73/152.54 |
| 8,701,480 B2 | 4/2014 | Eriksen ..................... 73/152.51 |
| 8,750,789 B2 | 6/2014 | Baldemair et al. ........... 455/11.1 |
| 8,787,840 B2 | 7/2014 | Srinivasan et al. ............. 455/69 |
| 8,805,632 B2 | 8/2014 | Coman et al. .................. 702/89 |
| 8,826,980 B2 | 9/2014 | Neer ......................... 166/255.1 |
| 8,833,469 B2 | 9/2014 | Purkis ........................... 166/373 |
| 8,893,784 B2 | 11/2014 | Abad .................... E21B 43/26 |
| 8,910,716 B2 | 12/2014 | Newton et al. ................. 166/373 |
| 8,994,550 B2 | 3/2015 | Millot et al. .......... E21B 47/16 |
| 8,995,837 B2 | 3/2015 | Mizuguchi et al. ... H04B 10/27 |
| 9,062,508 B2 | 6/2015 | Huval et al. .......... E21B 47/122 |
| 9,062,531 B2 | 6/2015 | Jones .................. E21B 47/082 |
| 9,075,155 B2 | 7/2015 | Luscombe et al. ..... G01V 1/226 |
| 9,078,055 B2 | 7/2015 | Nguyen et al. ........... H04R 5/00 |
| 9,091,153 B2 | 7/2015 | Yang et al. ............. E21B 47/12 |
| 9,133,705 B2 | 9/2015 | Angeles Boza ........ E21B 47/12 |
| 9,140,097 B2 | 9/2015 | Themig et al. ......... E21B 34/12 |
| 9,144,894 B2 | 9/2015 | Barnett et al. .......... B25B 17/00 |
| 9,206,645 B2 | 12/2015 | Hallundbaek ............. E21B 7/04 |
| 9,279,301 B2 | 3/2016 | Lovorn et al. ........ E21B 21/103 |
| 9,284,819 B2 | 3/2016 | Tolman et al. ......... E21B 41/00 |
| 9,284,834 B2 | 3/2016 | Alteirac et al. ......... E21B 47/12 |
| 9,310,510 B2 | 4/2016 | Godager .................. G01V 3/38 |
| 9,333,350 B2 | 5/2016 | Rise et al. ........ A61N 1/36082 |
| 9,334,696 B2 | 5/2016 | Hay ....................... E21B 47/12 |
| 9,359,841 B2 | 6/2016 | Hall ....................... E21B 23/00 |
| 9,363,605 B2 | 6/2016 | Goodman et al. ..... H04R 17/00 |
| 9,376,908 B2 | 6/2016 | Ludwig et al. ......... E21B 47/01 |
| 9,441,470 B2 * | 9/2016 | Guerrero ............. E21B 33/12 |
| 9,515,748 B2 | 12/2016 | Jeong et al. ............. G10L 25/90 |
| 9,557,434 B2 | 1/2017 | Keller et al. .............. G01V 1/52 |
| 9,617,829 B2 | 4/2017 | Dale et al. ............. E21B 41/00 |
| 9,617,850 B2 | 4/2017 | Fripp et al. ............. E21B 47/18 |
| 9,631,485 B2 | 4/2017 | Keller et al. ............ E21B 47/16 |
| 9,657,564 B2 | 5/2017 | Stolpman ............... E21B 47/16 |
| 9,664,037 B2 | 5/2017 | Logan et al. .......... E21B 47/122 |
| 9,670,773 B2 | 6/2017 | Croux .................... E21B 47/16 |
| 9,683,434 B2 | 6/2017 | Machocki ............... E21B 44/00 |
| 9,686,021 B2 | 6/2017 | Merino ................... E21B 47/16 |
| 9,715,031 B2 | 7/2017 | Contant et al. ....... E21B 47/122 |
| 9,721,448 B2 | 8/2017 | Wu et al. ................ G08B 21/20 |
| 9,759,062 B2 | 9/2017 | Deffenbaugh et al. ...... E21B 47/16 |
| 9,816,373 B2 | 11/2017 | Howell et al. .......... E21B 47/16 |
| 9,822,634 B2 | 11/2017 | Gao ....................... E21B 47/16 |
| 9,863,222 B2 | 1/2018 | Morrow et al. ...... E21B 43/122 |
| 9,879,525 B2 | 1/2018 | Morrow et al. .......... E21B 47/12 |
| 9,945,204 B2 | 4/2018 | Ross et al. ............. E21B 33/127 |
| 9,963,955 B2 | 5/2018 | Tolman et al. ....... E21B 43/119 |
| 10,100,635 B2 | 10/2018 | Keller et al. ........... E21B 47/18 |
| 10,103,846 B2 | 10/2018 | van Zelm et al. ...... E21B 47/12 |
| 10,132,149 B2 | 11/2018 | Morrow et al. ...... E21B 43/267 |
| 10,145,228 B2 | 12/2018 | Yarus et al. ........... E21B 44/00 |
| 10,167,716 B2 | 1/2019 | Clawson et al. ........ E21B 47/14 |
| 10,167,717 B2 | 1/2019 | Deffenbaugh et al. ...... E21B 47/16 |
| 10,190,410 B2 | 1/2019 | Clawson et al. ........ E21B 47/14 |
| 10,196,862 B2 | 2/2019 | Li-Leger et al. ....... E21B 17/02 |
| 2002/0180613 A1 | 12/2002 | Shi et al. ................ E21B 47/18 |
| 2003/0056953 A1 | 3/2003 | Tumlin et al. ................. 166/298 |
| 2003/0117896 A1 | 6/2003 | Sakuma et al. ................. 367/81 |
| 2004/0020063 A1 | 2/2004 | Lewis et al. ..................... 33/313 |
| 2004/0200613 A1 | 10/2004 | Fripp et al. .............. 166/250.01 |
| 2004/0239521 A1 | 12/2004 | Zierolf ......................... 340/854.1 |
| 2005/0269083 A1 | 12/2005 | Burris, II et al. ........... 166/255.2 |
| 2005/0284659 A1 | 12/2005 | Hall et al. ........................ 175/27 |
| 2006/0033638 A1 | 2/2006 | Hall et al. ................... 340/854.6 |
| 2006/0041795 A1 | 2/2006 | Gabelmann et al. ........ 714/699 |
| 2006/0090893 A1 | 5/2006 | Sheffield .................. 166/250.15 |
| 2007/0139217 A1 | 6/2007 | Beique et al. ............... 340/856.3 |
| 2007/0146351 A1 | 6/2007 | Katsuhara et al. ......... 345/179 |
| 2007/0156359 A1 | 7/2007 | Varsamis et al. ............... 702/69 |
| 2007/0219758 A1 | 9/2007 | Bloomfield .................. 702/190 |
| 2007/0254604 A1 | 11/2007 | Kim |
| 2007/0272411 A1 | 11/2007 | Lopez de Cardenas et al. ........... 166/305.1 |
| 2008/0030365 A1 | 2/2008 | Fripp et al. .............. E21B 47/16 |
| 2008/0060505 A1 * | 3/2008 | Chang ..................... G10H 1/40 84/612 |
| 2008/0076536 A1 * | 3/2008 | Shayesteh ................ G07F 1/06 463/25 |
| 2008/0110644 A1 | 5/2008 | Howell et al. ................. 166/387 |
| 2008/0185144 A1 | 8/2008 | Lovell ...................... 166/250.17 |
| 2008/0304360 A1 | 12/2008 | Mozer ........................... 367/117 |
| 2009/0003133 A1 | 1/2009 | Dalton et al. ..................... 367/82 |
| 2009/0030614 A1 | 1/2009 | Carnegie et al. ................. 702/6 |
| 2009/0034368 A1 | 2/2009 | Johnson ........................... 367/83 |
| 2009/0045974 A1 | 2/2009 | Patel ............................ 340/854.6 |
| 2009/0080291 A1 | 3/2009 | Tubel et al. ...................... 367/81 |
| 2009/0166031 A1 | 7/2009 | Hernandez ............... 166/250.01 |
| 2010/0013663 A1 | 1/2010 | Cavender et al. .......... 340/854.3 |
| 2010/0080086 A1 * | 4/2010 | Wright ..................... H04B 11/00 367/191 |
| 2010/0089141 A1 | 4/2010 | Rioufol et al. ............. 73/152.28 |
| 2010/0112631 A1 | 5/2010 | Hur et al. ........................ 435/39 |
| 2010/0133004 A1 | 6/2010 | Burleson et al. .................. 175/2 |
| 2010/0182161 A1 | 7/2010 | Robbins et al. ........... 340/853.7 |
| 2010/0212891 A1 | 8/2010 | Stewart et al. .......... 166/250.12 |
| 2011/0061862 A1 | 3/2011 | Loretz et al. ............. 166/250.11 |
| 2011/0066378 A1 | 3/2011 | Lerche et al. .................... 702/6 |
| 2011/0168403 A1 | 7/2011 | Patel ............................... 166/373 |
| 2011/0188345 A1 | 8/2011 | Wang ............................... 367/34 |
| 2011/0297376 A1 | 12/2011 | Holderman et al. .......... 166/278 |
| 2011/0297673 A1 | 12/2011 | Zbat et al. ..................... 219/756 |
| 2011/0301439 A1 | 12/2011 | Albert et al. ................. 600/301 |
| 2011/0315377 A1 | 12/2011 | Rioufol .................... 166/250.17 |
| 2012/0043079 A1 | 2/2012 | Wassouf et al. ............. 166/250 |
| 2012/0126992 A1 | 5/2012 | Rodney et al. ............... 340/850 |
| 2012/0152562 A1 | 6/2012 | Newton et al. ................ 166/369 |
| 2012/0179377 A1 | 7/2012 | Lie ...................................... 702/6 |
| 2013/0000981 A1 | 1/2013 | Grimmer et al. ................ 175/45 |
| 2013/0003503 A1 | 1/2013 | L'Her et al. ..................... 367/117 |
| 2013/0106615 A1 | 5/2013 | Prammer ................... 340/854.6 |
| 2013/0138254 A1 | 5/2013 | Seals et al. .................... 700/282 |
| 2013/0192823 A1 | 8/2013 | Barrilleaux et al. ...... 166/250.01 |
| 2013/0278432 A1 | 10/2013 | Shashoua et al. ......... 340/853.7 |
| 2013/0319102 A1 | 12/2013 | Ringgenberg et al. ..... 73/152.28 |
| 2014/0060840 A1 | 3/2014 | Hartshorne et al. ........... 166/300 |
| 2014/0062715 A1 | 3/2014 | Clark .......................... 340/853.2 |
| 2014/0079242 A1 * | 3/2014 | Nguyen .................... H04R 5/00 381/86 |
| 2014/0102708 A1 | 4/2014 | Purkis et al. ............... 166/308.1 |
| 2014/0133276 A1 | 5/2014 | Volker et al. .................... 367/82 |
| 2014/0152659 A1 | 6/2014 | Davidson et al. ............ 345/420 |
| 2014/0153368 A1 | 6/2014 | Bar-Cohen et al. ............ 367/81 |
| 2014/0166266 A1 | 6/2014 | Read ........................ 166/250.01 |
| 2014/0170025 A1 | 6/2014 | Weiner et al. .............. 422/82.01 |
| 2014/0266769 A1 | 9/2014 | van Zelm ................... 340/854.3 |
| 2014/0327552 A1 | 11/2014 | Filas et al. ................... 340/854.6 |
| 2014/0352955 A1 | 12/2014 | Tubel et al. ............... 166/250.15 |
| 2015/0003202 A1 | 1/2015 | Palmer et al. ................... 367/82 |
| 2015/0009040 A1 | 1/2015 | Bowles et al. .............. 340/854.6 |
| 2015/0027687 A1 | 1/2015 | Tubel ............................... 166/72 |
| 2015/0041124 A1 | 2/2015 | Rodriguez ................. 166/255.1 |
| 2015/0041137 A1 | 2/2015 | Rodriguez ..................... 166/301 |
| 2015/0152727 A1 | 6/2015 | Fripp et al. .............. E21B 47/14 |
| 2015/0159481 A1 | 6/2015 | Mebarkia et al. ...... E21B 47/065 |
| 2015/0167425 A1 | 6/2015 | Hammer et al. ........ E21B 34/06 |
| 2015/0176370 A1 | 6/2015 | Greening et al. ........ E21B 41/00 |
| 2015/0292319 A1 | 10/2015 | Disko et al. ............. E21B 47/16 |
| 2015/0292320 A1 | 10/2015 | Lynk et al. ................ E21B 47/16 |
| 2015/0300159 A1 | 10/2015 | Stiles et al. ............... E21B 47/16 |
| 2015/0330200 A1 | 11/2015 | Richard et al. .......... E21B 44/00 |
| 2015/0337642 A1 | 11/2015 | Spacek ................... E21B 44/005 |
| 2015/0354351 A1 | 12/2015 | Morrow et al. ......... E21B 47/16 |
| 2015/0377016 A1 | 12/2015 | Ahmad .................. E21B 47/122 |
| 2016/0010446 A1 | 1/2016 | Logan et al. ........... E21B 47/122 |
| 2016/0047230 A1 | 2/2016 | Livescu et al. .......... E21B 47/10 |
| 2016/0047233 A1 | 2/2016 | Butner et al. ............. E21B 47/12 |
| 2016/0076363 A1 | 3/2016 | Morrow et al. .......... E21B 47/12 |
| 2016/0109606 A1 | 4/2016 | Market et al. ............ G01V 1/50 |

(56) References Cited

U.S. PATENT DOCUMENTS

| | | | |
|---|---|---|---|
| 2016/0215612 A1 | 7/2016 | Morrow | E21B 47/122 |
| 2017/0138185 A1 | 5/2017 | Saed et al. | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/035 |
| 2018/0066510 A1 | 3/2018 | Walker et al. | E21B 47/011 |
| 2019/0112913 A1 | 4/2019 | Song et al. | E21B 47/01 |
| 2019/0112915 A1 | 4/2019 | Disko et al. | E21B 47/14 |
| 2019/0112916 A1 | 4/2019 | Song et al. | E21B 47/14 |
| 2019/0112917 A1 | 4/2019 | Disko et al. | E21B 47/14 |
| 2019/0112918 A1 | 4/2019 | Yi et al. | E21B 4/16 |
| 2019/0112919 A1 | 4/2019 | Song et al. | E21B 47/16 |
| 2019/0116085 A1 | 4/2019 | Zhang et al. | H04L 12/24 |

FOREIGN PATENT DOCUMENTS

| | | | |
|---|---|---|---|
| EP | 1409839 | 4/2005 | E21B 43/1185 |
| EP | 2677698 | 12/2013 | H04L 12/28 |
| EP | 2763335 | 8/2014 | |
| WO | WO2002/027139 | 4/2002 | E21B 43/12 |
| WO | WO2010/074766 | 7/2010 | A41C 1/14 |
| WO | WO2013/079928 | 6/2013 | E21B 47/12 |
| WO | WO20141018010 | 1/2014 | E21B 47/12 |
| WO | WO2014/049360 | 4/2014 | E21B 47/12 |
| WO | WO2014/100271 | 6/2014 | E21B 47/12 |
| WO | WO2014/134741 | 9/2014 | E21B 47/13 |
| WO | WO2015/117060 | 8/2015 | E21B 47/12 |

OTHER PUBLICATIONS

U.S. Appl. No. 16/175,441, filed Oct. 30, 2018, Song, Limin et al.
U.S. Appl. No. 16/175,467, filed Oct. 30, 2018, Kinn, Timothy F. et al.
U.S. Appl. No. 16/175,488, filed Oct. 30, 2018, Yi, Xiaohua et al.
U.S. Appl. No. 16/220,327, filed Dec. 14, 2018, Disko, Mark M. et al.
U.S. Appl. No. 16/220,332, filed Dec. 14, 2018, Yi, Xiaohua et al.
U.S. Appl. No. 16/269,083, filed Feb. 6, 2019, Zhang, Yibing.
U.S. Appl. No. 16/267,950, filed Feb. 5, 2019, Walker, Katie M. et al.
U.S. Appl. No. 62/782,153, filed Dec. 19, 2019, Yi, Xiaohua et al.
U.S. Appl. No. 62/782,160, filed Dec. 19, 2018, Hall, Timothy J. et al.
Arroyo, Javier et al. (2009) "Forecasting Histogram Time Series with K-Nearest Neighbours Methods," *International Journal of Forecasting*, vol. 25, pp. 192-207.
Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.
Arroyo, Javier et al. (2011) "Forecasting with Interval and Histogram Data Some Financial Applications," *Univ. of California, Dept. of Economics*, 46 pages.
Emerson Process Management (2011), "Roxar downhole Wireless PT sensor system," www.roxar.com, or downhole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, vol. 28, 36 pgs.
Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.
Qu, X. et al. (2011) "Reconstruction fo Self-Sparse 20 NMR Spectra From undersampled Data in the Indirect Dimension", pp. 8888-8909.
U.S. Department of Defense (1999) "Interoperability and Performance Standards for Medium and High Frequency Radio Systems," *MIL-STD-188-141B*, Mar. 1, 1999, 584 pages.

* cited by examiner

FIG. 6

| Time Interval | Bin | | | | | | | | | | | | | | Span |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | |
| 1 | 0 | 0 | 0 | 0 | 0 | 0 | 0 | 0 | 0 | 0 | 0 | 0 | 0 | 14 | 4 |
| 2 | 0 | 2 | 0 | 2 | 1 | 1 | 3 | 308 | 0 | 11 | 17 | 6 | 12 | 14 | 13 |
| 3 | 1 | 2 | 0 | 0 | 0 | 1 | 0 | 2 | 0 | 1 | 1 | 8 | 1 | 3 | 14 |
| 4 | 0 | 0 | 0 | 0 | 4 | 2 | 6 | 0 | 6 | 17 | 14 | 193 | 16 | 152 | 9 |
| 5 | 0 | 0 | 0 | 0 | 0 | 1 | 2 | 4 | 0 | 6 | 5 | 110 | 10 | 0 | 9 |
| 6 | 0 | 0 | 0 | 1 | 0 | 0 | 3 | 6 | 3 | 6 | 15 | 4 | 20 | 110 | 11 |
| 7 | 18 | 33 | 23 | 30 | 19 | 34 | 21 | 11 | 18 | 18 | 20 | 15 | 23 | 115 | 14 |
| 8 | 18 | 25 | 23 | 35 | 30 | 46 | 16 | 8 | 16 | 19 | 19 | 18 | 28 | 29 | 14 |
| 9 | 30 | 37 | 52 | 43 | 33 | 44 | 28 | 18 | 18 | 28 | 30 | 27 | 33 | 21 | 14 |
| 10 | 42 | 66 | 22 | 29 | 24 | 30 | 25 | 11 | 21 | 22 | 30 | 26 | 24 | 32 | 14 |

| Bin | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Total Hits | 0 | 0 | 0 | 0 | 4 | 3 | 8 | 4 | 6 | 23 | 34 | 202 | 42 | 124 |

*FIG. 7*

METHODS OF NETWORK PEER IDENTIFICATION AND SELF-ORGANIZATION USING UNIQUE TONAL SIGNATURES AND WELLS THAT USE THE METHODS

CROSS REFERENCE TO RELATED APPLICATIONS

This application claims priority to U.S. Provisional Application Ser. No. 62/628,105, filed Feb. 8, 2018 entitled "Methods of Network Peer Identification and Self-Organization using Unique Tonal Signatures and Wells that Use the Methods;" and U.S. Provisional Application Ser. No. 62/799,881, filed Feb. 1, 2019 entitled "Methods of Network Peer Identification and Self-Organization using Tonal Signatures and wells that use the Methods," the disclosure of each of which are incorporated herein by reference in their entirety.

This application is related to U.S. Provisional Application Ser. No. 62/428,385, filed Nov. 30, 2016, "Methods of Acoustically Communicating And Wells That Utilize The Methods," and U.S. Provisional Application Ser. No. 62/381,926, filed Aug. 31, 2016, "Plunger Lift Monitoring Via A Downhole Wireless Network Field," and U.S. Pat. No. 10,190,410, the disclosure of each of which are incorporated herein by reference in their entirety.

FIELD OF THE DISCLOSURE

The present disclosure relates generally to methods of acoustically communicating and/or to wells that use the methods.

BACKGROUND OF THE DISCLOSURE

An acoustic wireless network may be used to wirelessly transmit an acoustic signal, such as a vibration, via a tone transmission medium. In general, a given tone transmission medium will only permit communication within a certain frequency range; and, in some systems, this frequency range may be relatively small. Such systems may be referred to herein as spectrum-constrained systems. An example of a spectrum-constrained system is a well, such as a hydrocarbon well, that includes a plurality of communication nodes spaced-apart along a length thereof.

Known methods of installing and operating the nodes of such a network require significant time and energy. Nodes have been required to be installed on the casing in numeric order, requiring a large investment of time, an extended spatial footprint, and an extreme logistical plan for casing movement. Once installed in the well, operation of the network requires ongoing investigation of optimal operating conditions and potential networked node pairings. This is an iterative manual process requiring a significant testing time, and also drains energy of all nodes used to send the commands to perform the tests.

The above method also incurs significant risk. Incorrect numbering of the nodes or installation in the wrong order will result in an unworkable network, and extensive reconfiguration may be necessary to correct the mistake, costing substantial operator time and draining energy from a number of nodes on the network. Accidental misconfiguration while operating (such as assigning a duplicate or out-of-order number to a node, or linking them in an endless loop) carries with it a similar risk.

A typical method of addressing the numbering issue uses a central authority to number all manufactured nodes sequentially. This guarantees uniqueness but does not address out-of-order installation, nor does it prevent accidental misconfiguration, and the approach still requires the central authority to touch each node (to assign the number), thereby limiting manufacturing efficiency.

An alternate technique has each node assign itself a random number and eliminates the requirement to install nodes in sequential order. This removes the out-of-order risk and greatly reduces the risk of operational misconfiguration, but it cannot guarantee uniqueness because it is possible that two nodes will randomly assign themselves the same number. To minimize (though still not eliminate) the risk of duplicate numbers, a typical implementation makes the random number very large. Unfortunately, nodes must routinely transmit this number as part of each communication, so using a very large number leads to additional energy drain via excessive transmitted tones. What is needed is a method of identifying nodes in a network after installation and without using energy-draining random identification numbers.

SUMMARY OF THE DISCLOSURE

Methods of acoustically communicating and wells that use the methods are disclosed herein. The methods generally use an acoustic wireless network including a plurality of nodes spaced-apart along a length of a tone transmission medium. According to disclosed aspects, there is provided a method of communication using a wireless network, such as an acoustic wireless network using one or more well components as a tone transmission medium as described herein. A wireless transmission of a signal is received at a first node. The signal has a frequency signature and/or an amplitude signature, which in some aspects may be a time-based frequency signature and/or a time-based amplitude signature. The frequency signature and/or the amplitude signature of the received signal is compared with a frequency signature and/or an amplitude signature of a previously received signal. If it is determined that the frequency signature and/or the amplitude signature of the received signal and the frequency signature and/or the amplitude signature of the previously received signal are within a predetermined range of similarity, the received signal and the previously received signal are accepted as having been transmitted by the second node.

BRIEF DESCRIPTION OF THE DRAWINGS

FIG. 6 is a table illustrating histogram data that may be used to determine the major frequency of the received acoustic tone of FIGS. 4-5.

FIG. 7 is a table illustrating a mechanism, according to the present disclosure, by which the major frequency of the acoustic tone of FIGS. 4-5 may be selected.

DETAILED DESCRIPTION AND BEST MODE OF THE DISCLOSURE

Figure 1:
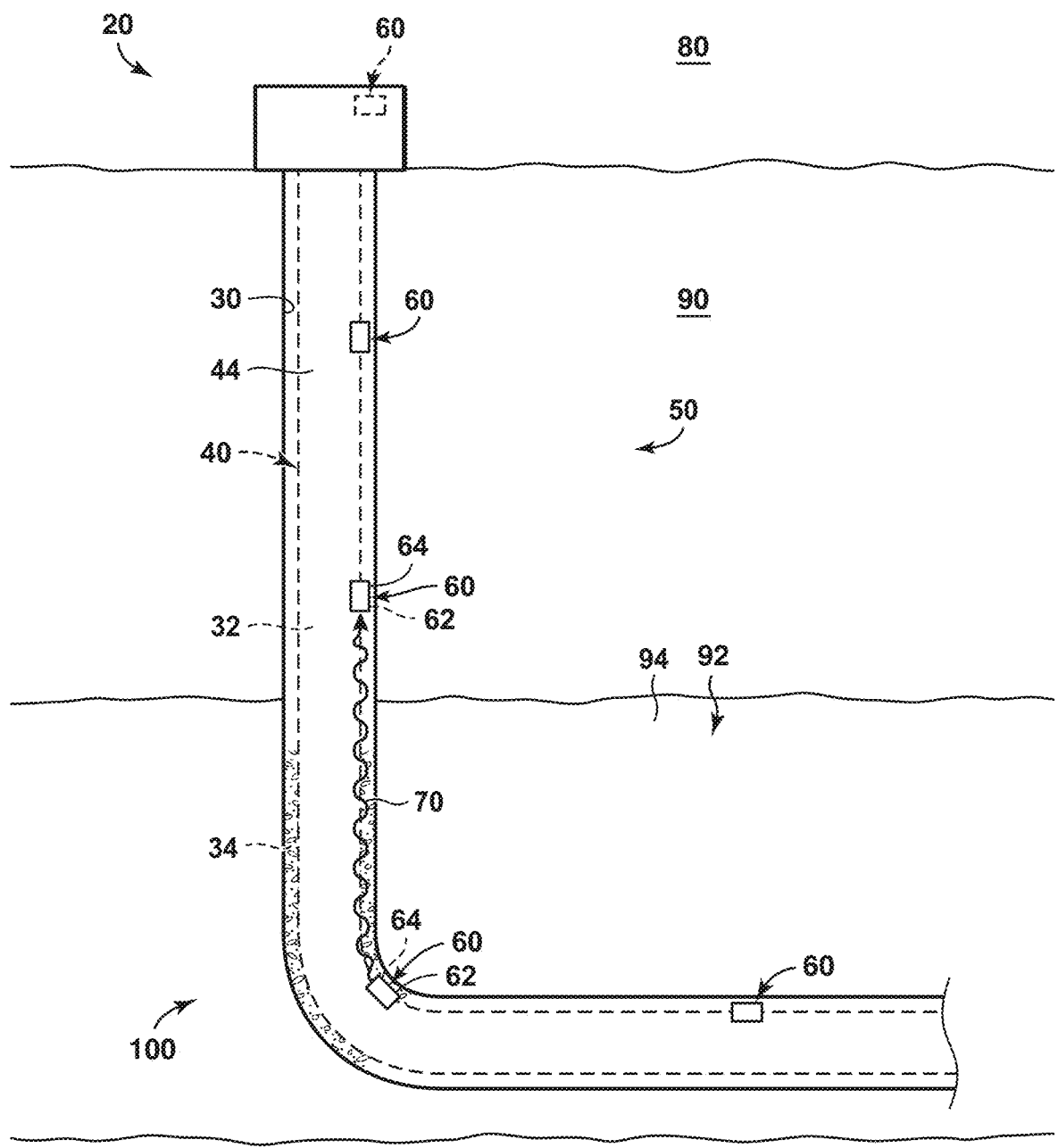
FIG. 1 is a schematic representation of a well configured to use the methods according to the present disclosure.

The following is a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

If any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, used, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "fluid" refers to gases, liquids, and combinations of gases and liquids, as well as to combinations of gases and solids, and combinations of liquids and solids.

FIGS. 1-10 provide examples of methods 200 and/or 1000, according to the present disclosure, and/or of wells 20 including acoustic wireless networks 50 that may include and/or use the methods. Elements that serve a similar, or at least substantially similar, purpose are labeled with like numbers in each of FIGS. 1-10, and these elements may not be discussed in detail herein with reference to each of FIGS. 1-10. Similarly, all elements may not be labeled in each of FIGS. 1-10, but reference numerals associated therewith may be used herein for consistency. Elements, components, and/or features that are discussed herein with reference to one or more of FIGS. 1-10 may be included in and/or used with any of FIGS. 1-10 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic representation of a well 20 configured to use methods 200, and/or 1000 according to the present disclosure. Well 20 includes a wellbore 30 that extends within a subsurface region 90. Wellbore 30 also may be referred to herein as extending between a surface region 80 and subsurface region 90 and/or as extending within a subterranean formation 92 that extends within the subsurface region. Subterranean formation 92 may include a hydrocarbon 94. Under these conditions, well 20 also may be referred to herein as, or may be, a hydrocarbon well 20, a production well 20, and/or an injection well 20.

Well 20 also includes an acoustic wireless network 50. The acoustic wireless network also may be referred to herein as a downhole acoustic wireless network 50 and includes a plurality of nodes 60, which are spaced-apart along a tone transmission medium 100 that extends along a length of wellbore 30. In the context of well 20, tone transmission medium 100 may include a downhole tubular 40 that may extend within wellbore 30, a wellbore fluid 32 that may extend within wellbore 30, a portion of subsurface region 90 that is proximal wellbore 30, a portion of subterranean formation 92 that is proximal wellbore 30, and/or a cement 34 that may extend within wellbore 30 and/or that may extend within an annular region between wellbore 30 and downhole tubular 40. Downhole tubular 40 may define a fluid conduit 44.

Nodes 60 may include one or more encoding nodes 62, which may be configured to generate an acoustic tone 70 and/or to induce the acoustic tone within tone transmission medium 100. Nodes 60 also may include one or more decoding nodes 64, which may be configured to receive acoustic tone 70 from the tone transmission medium. A given node 60 may function as both an encoding node 62 and a decoding node 64 depending upon whether the given node is transmitting an acoustic tone (i.e., functioning as the encoding node) or receiving the acoustic tone (i.e., functioning as the decoding node). Stated another way, the given node may include both encoding and decoding functionality, or structures, with these structures being selectively used depending upon whether or not the given node is encoding the acoustic tone or decoding the acoustic tone.

In wells 20, transmission of acoustic tone 70 may be along a length of wellbore 30. As such, the transmission of the acoustic tone may be linear, at least substantially linear, and/or directed, such as by tone transmission medium 100. Such a configuration may be in contrast to more conventional wireless communication methodologies, which generally may transmit a corresponding wireless signal in a plurality of directions, or even in every direction.

Figure 2:
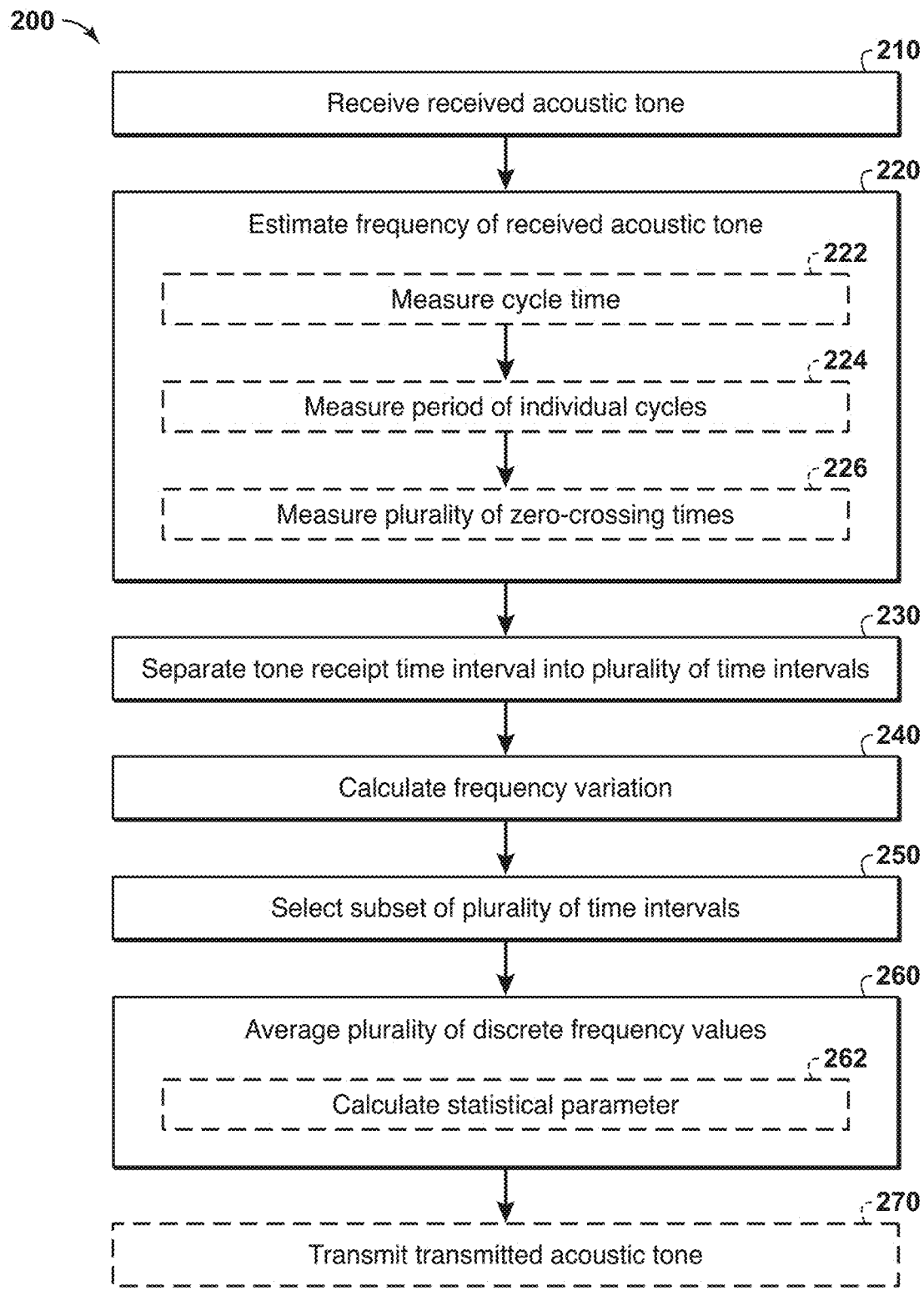
FIG. 2 is a flowchart depicting methods, according to the present disclosure, of determining a major frequency of a received acoustic tone.

FIG. 2 is a flowchart depicting methods 200, according to the present disclosure, of determining a major frequency of a received acoustic tone that is transmitted via a tone transmission medium using histograms generated from the received acoustic tone. Methods 200 may be performed using any suitable structure and/or structures. As an example, methods 200 may be used by an acoustic wireless network, such as acoustic wireless network 50 of FIG. 1. Under these conditions, methods 200 may be used to communicate along a length of wellbore 30.

Methods 200 include receiving a received acoustic tone at 210, estimating a frequency of the received acoustic tone at 220, and separating a tone receipt time into a plurality of time intervals at 230. Methods 200 also include calculating a frequency variation at 240, selecting a subset of the plurality of time intervals at 250, and averaging a plurality of discrete frequency values at 260. Methods 200 further may include transmitting a transmitted acoustic tone at 270.

Receiving the received acoustic tone at 210 may include receiving with a decoding node of an acoustic wireless network. Additionally or alternatively, the receiving at 210 may include receiving from the tone transmission medium and/or receiving for a tone receipt time. The receiving at 210 may include receiving for any suitable tone receipt time. As examples, the tone receipt time may be at least 1 microsecond, at least 10 microseconds, at least 25 microseconds, at least 50 microseconds, at least 75 microseconds, or at least 100 microseconds. The receiving at 210 also may include receiving at any suitable frequency, or tone frequency. Examples of the tone frequency include frequencies of at least 10 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, the tone frequency may be at most 1 megahertz (MHz), at most 800 kHz, at most 600 kHz, at most 400 kHz, at most 200 kHz, at most 150 kHz, at most 100 kHz, and/or at most 80 kHz.

The receiving at 210 may include receiving with any suitable decoding node, such as decoding node 64 of FIG. 1. Additionally or alternatively, the receiving at 210 may include receiving with an acoustic tone receiver. Examples of the acoustic tone receiver include a piezoelectric tone receiver, a piezoresistive tone receiver, a resonant MEMS tone receiver, a non-resonant MEMS tone receiver, and/or a receiver array.

Figure 3:
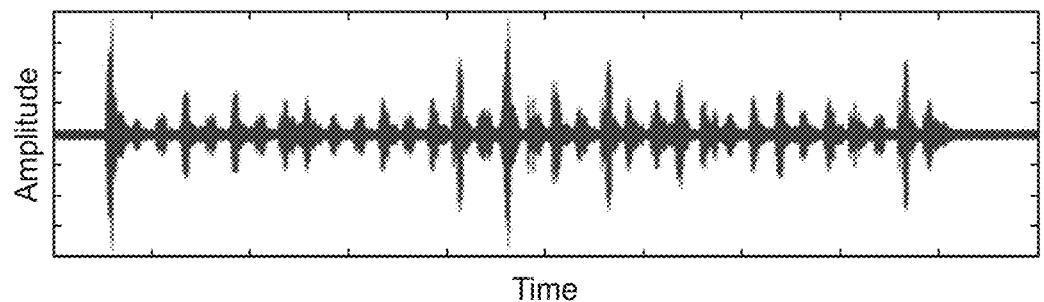
FIG. 3 is a plot illustrating a received amplitude of a plurality of received acoustic tones as a function of time.
Figure 4:
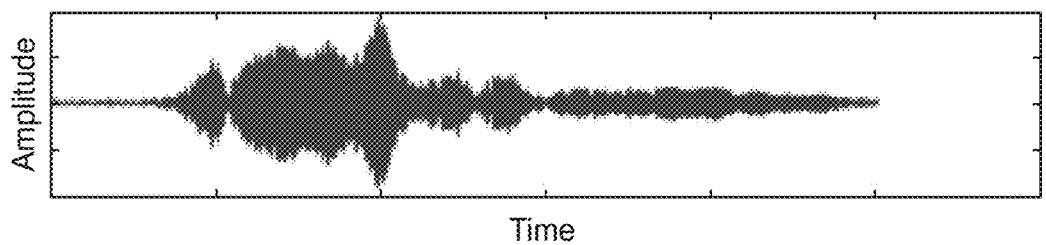
FIG. 4 is a plot illustrating a received amplitude of an acoustic tone from FIG. 3.

An example of a plurality of received acoustic tones is illustrated in FIG. 3, while an example of a single received acoustic tone is illustrated in FIG. 4. FIGS. 3-4 both illustrate amplitude of the received acoustic tone as a function of time (e.g., the tone receipt time). As illustrated in FIGS. 3-4, the amplitude of the received acoustic tone may vary significantly during the tone receipt time. This variation may be caused by non-idealities within the tone transmission medium and/or with the tone transmission process. Examples of these non-idealities are discussed herein and include acoustic tone reflection points within the tone transmission medium, generation of harmonics during the tone transmission process, ringing within the tone transmission medium, and/or variations in a velocity of the acoustic tone within the tone transmission medium. Collectively, these non-idealities may make it challenging to determine, to accurately determine, and/or to reproducibly determine the major frequency of the received acoustic tone, and methods 200 may facilitate this determination.

Estimating the frequency of the received acoustic tone at 220 may include estimating the frequency of the received acoustic tone as a function of time and/or during the tone receipt time. This may include estimating a plurality of discrete frequency values received at a corresponding plurality of discrete times within the tone receipt time and may be accomplished in any suitable manner.

As an example, the received acoustic tone may include, or be, a received acoustic wave that has a time-varying amplitude within the tone receipt time, as illustrated in FIGS. 3-4. The time-varying amplitude may define an average amplitude, and the estimating at 220 may include measuring a cycle time between the time-varying amplitude and the average amplitude (222), measuring a period of individual cycles of the received acoustic wave (224), and/or measuring a plurality of zero-crossing times of the received acoustic wave (226).

Figure 5:
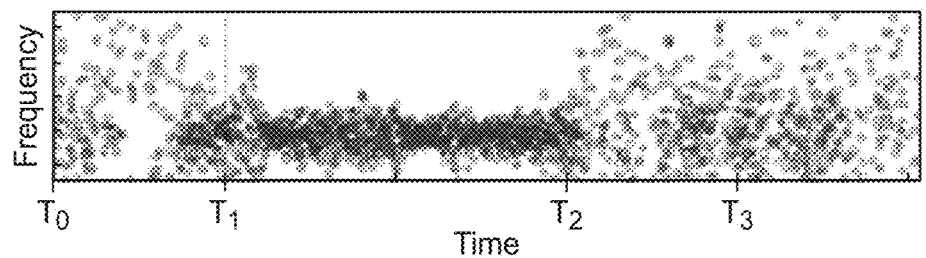
FIG. 5 is a plot illustrating frequency variation in the received acoustic tone of FIG. 4.

The estimating at 220 may be used to generate a dataset that represents the frequency of the received acoustic tone as a function of time during the tone receipt time. An example of such a dataset is illustrated in FIG. 5. As may be seen in FIG. 5 the frequency of the received acoustic tone includes time regions where there is a relatively higher amount of variation, such as the time regions from $T_0$ to $T_1$ and from $T_2$ to $T_3$ in FIG. 5, and a time region where there is a relatively lower amount of variation, such as time region from $T_1$ to $T_2$ in FIG. 5.

Separating the tone receipt time into the plurality of time intervals at 230 may include separating such that each time interval in the plurality of time intervals includes a subset of the plurality of discrete frequency values that was received and/or determined during that time interval. It is within the scope of the present disclosure that each time interval in the plurality of time intervals may be less than a threshold fraction of the tone receipt time. Examples of the threshold fraction of the tone receipt time include threshold fractions of less than 20%, less than 15%, less than 10%, less than 5%, or less than 1%. Stated another way, the separating at 230 may include separating the tone receipt time into at least a threshold number of time intervals. Examples of the threshold number of time intervals includes at least 5, at least 7, at least 10, at least 20, or at least 100 time intervals. It is within the scope of the present disclosure that a duration of each time interval in the plurality of time intervals may be the same, or at least substantially the same, as a duration of each other time interval in the plurality of time intervals. However, this is not required to all implementations, and the duration of one or more time interval in the plurality of time intervals may differ from the duration of one or more other time intervals in the plurality of time intervals.

Calculating the frequency variation at 240 may include calculating any suitable frequency variation within each time interval and/or within each subset of the plurality of discrete frequency values. The calculating at 240 may be performed in any suitable manner and/or may calculate any suitable measure of variation, or frequency variation. As an example, the calculating at 240 may include calculating a statistical parameter indicative of variability within each subset of the plurality of discrete frequency values. As another example, the calculating at 240 may include calculating a frequency range within each subset of the plurality of discrete frequency values. As yet another example, the calculating at 240 may include calculating a frequency standard deviation of, or within, each subset of the plurality of discrete frequency values. As another example, the calculating at 240 may include scoring each subset of the plurality of discrete frequency values.

As yet another example, the calculating at 240 may include assessing a margin, or assessing the distinctiveness of a given frequency in a given time interval relative to the other frequencies detected during the given time interval. This may include using a magnitude and/or a probability density to assess the distinctiveness and/or using a difference between a magnitude of a most common histogram element and a second most common histogram element within the given time interval to assess the distinctiveness.

As a more specific example, and when the calculating at 240 includes calculating the frequency range, the calculating at 240 may include binning, or separating, each subset of the plurality of discrete frequency values into bins. This is illustrated in FIG. 6. Therein, a number of times that a given frequency (i.e., represented by bins 1-14) is observed within a given time interval (i.e., represented by time intervals 1-10) is tabulated. A zero value for a given frequency bin-time interval combination indicates that the given frequency bin was not observed during the given time interval, while a non-zero number indicates the number of times that the given frequency bin was observed during the given time interval.

Under these conditions, the calculating at 240 may include determining a span, or range, of the frequency bins. In the example of FIG. 6, the uppermost bin that includes at least one count is bin 14, while the lowermost bin that includes at least one count is bin 11. Thus, the span, or range, is 4, as indicated.

Selecting the subset of the plurality of time intervals at 250 may include selecting a subset within which the frequency variation, as determined during the calculating at 240, is less than a threshold frequency variation. Experimental data suggests that time intervals within which the frequency variation is less than the threshold frequency variation represent time intervals that are more representative of the major frequency of the received acoustic tone. As such, the selecting at 250 includes selectively determining which time intervals are more representative of, or more likely to include, the major frequency of the received acoustic tone, thereby decreasing noise in the overall determination of the major frequency of the received acoustic tone.

The selecting at 250 may include selecting a continuous range within the tone receipt time or selecting two or more ranges that are spaced-apart in time within the tone receipt time. Additionally or alternatively, the selecting at 250 may include selecting at least 2, at least 3, at least 4, or at least 5 time intervals from the plurality of time intervals.

The selecting at 250 additionally or alternatively may include selecting such that the frequency variation within each successive subset of the plurality of discrete frequency values decreases relative to a prior subset of the plurality of discrete frequency values and/or remains unchanged relative to the prior subset of the plurality of discrete frequency values.

An example of the selecting at 250 is illustrated in FIG. 6. In this example, time intervals with a span of less than 10 are selected and highlighted in the table. These include time intervals 1, 4, and 5.

Averaging the plurality of discrete frequency values at 260 may include averaging within the subset of the plurality of time intervals that was selected during the selecting at 250 and/or averaging to determine the major frequency of the received acoustic tone. The averaging at 260 may be accomplished in any suitable manner. As an example, the averaging at 260 may include calculating a statistical parameter indicative of an average of the plurality of discrete frequency values within the subset of the plurality of time intervals. As another example, the averaging at 260 may include calculating a mean, median, or mode value of the plurality of discrete frequency values within the subset of the plurality of time intervals.

As a more specific example, and with reference to FIGS. 6-7, the averaging at 260 may include summing the bins for the time intervals that were selected during the selecting at 250. As discussed, and using one criteria for the selecting at 250, bins 1, 4, and 5 from FIG. 6 may be selected. The number of counts in these three bins then may be summed to arrive at FIG. 7, and the bin with the most counts, which represents the most common, or mode, frequency of the selected time intervals, may be selected. In the example of FIG. 7, this may include selecting bin 12, or the frequency of bin 12, as the major frequency of the received acoustic tone.

Transmitting the transmitted acoustic tone at 270 may include transmitting with an encoding node of the acoustic wireless network. The transmitting at 270 may be subsequent, or responsive, to the averaging at 260; and a transmitted frequency of the transmitted acoustic tone may be based, at least in part, on, or equal to, the major frequency of the received acoustic tone. Stated another way, the transmitting at 270 may include repeating, or propagating, the major frequency of the received acoustic tone along the length of the tone transmission medium, such as to permit and/or facilitate communication along the length of the tone transmission medium.

According to an aspect of the disclosure, an acoustic telemetry packet may be sent from node to node along a casing in a wellbore. A node in a fixed location, such as a hydrophone, may listen to the telemetry progress down the acoustic wireless network and a representation of the received acoustic signal may be recorded. This representation is known colloquially as a histogram or polyhistogram and may be generated as previously disclosed, or by collecting zero-crossings interpreted in time bins, such as 1 millisecond-long bins, by a receiver algorithm when receiving a telemetry packet. Other means of analyzing the frequency and/or amplitude of a received acoustic signal may be used, such as: performing a Fourier transform of the received acoustic signal; performing a fast Fourier transform (FFT) of the received acoustic signal; performing a discrete Fourier transform of the received acoustic signal; performing a wavelet transform of the received acoustic signal; performing a multiple least squares analysis of the received acoustic signal; margin, span with zero crossing rate to (ZCR); margin, span with Fast Fourier Transforms (FFT), and the like. The process of identifying frequencies in a wireless network using histograms is described in co-pending and commonly owned U.S. Patent Application Publication No. 2018/058,204, the disclosure of which is incorporated by reference herein in its entirety.

Figure 8A:
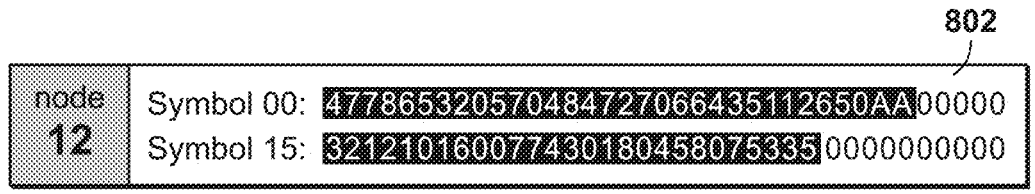
FIGS. 8A-8D depict digital representations of polyhistogram signatures of a received signal.
Figure 8B:
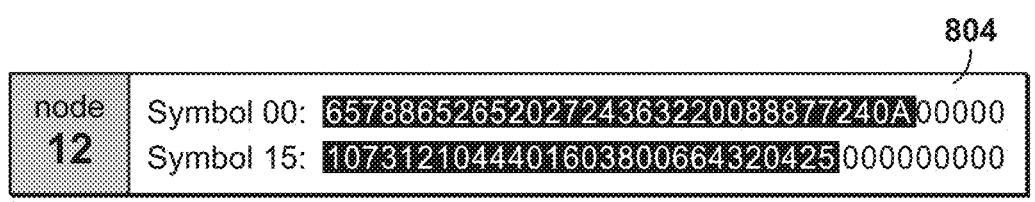
Figure 8C:
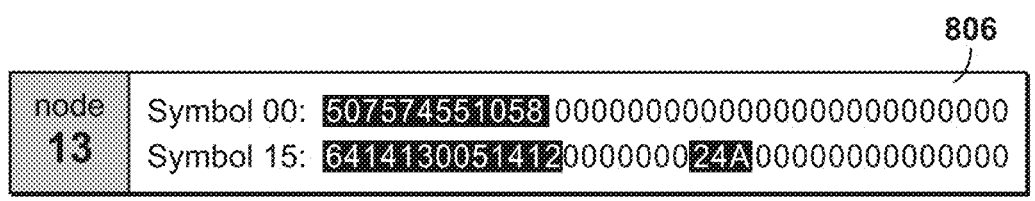
Figure 8D:
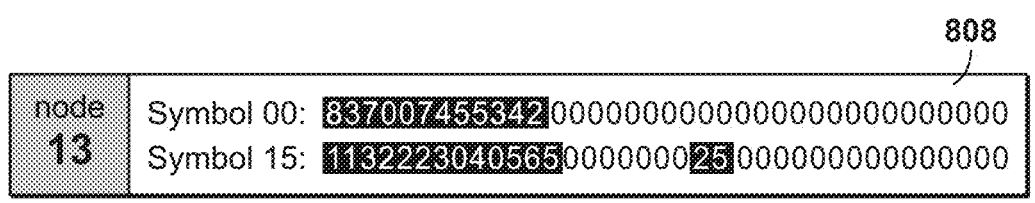

As seen in FIGS. 8A-8D, each frequency transmitted by a given node has its own pattern of higher and lower graded polyhistogram bins when received by a specific receiver. These patterns or signatures, which may be termed tonal signatures, polyhistogram signatures, or the like, vary by node due to the physical variability, however slight, of the node assembly and installation, and also may be impacted by the distance from the transmitting node to the receiving node. Furthermore, other non-idealities which may impact frequency signatures and/or amplitude signatures include acoustic tone reflection points within the tone transmission medium, generation of harmonics during the tone transmission process, ringing within the tone transmission medium, variations in a velocity of the acoustic tone within the tone transmission medium, the specific arrangement of distances and material properties (density, refraction index, etc.) unique to each transmit/receiver pair of nodes. For example, FIG. 8A shows a polyhistogram signature 802 for a listener (such as a node in an acoustic wireless network) when a specific node, such as node 12, transmits two specific tones. As shown in FIG. 8B, the listener may hear a similar polyhistogram signature 804 when node 12 later transmits the same two tones. While the digits of the two polyhistogram signatures 802, 804 are not identical, known pattern recognition techniques may be used to determine that the signatures are sufficiently similar for the purposes of identifying a unique source of the transmitted tones. As shown in FIG. 8C, the same listener hears a different polyhistogram signature 806 when a different node, such as node 13, transmits the same two tones. The listener hears a polyhistogram signature 808 when node 13 later transmits the same two tones. Polyhistogram signature 808 is similar to polyhistogram signature 806, but differs from polyhistogram signatures 802 and 804.

Figure 9A:
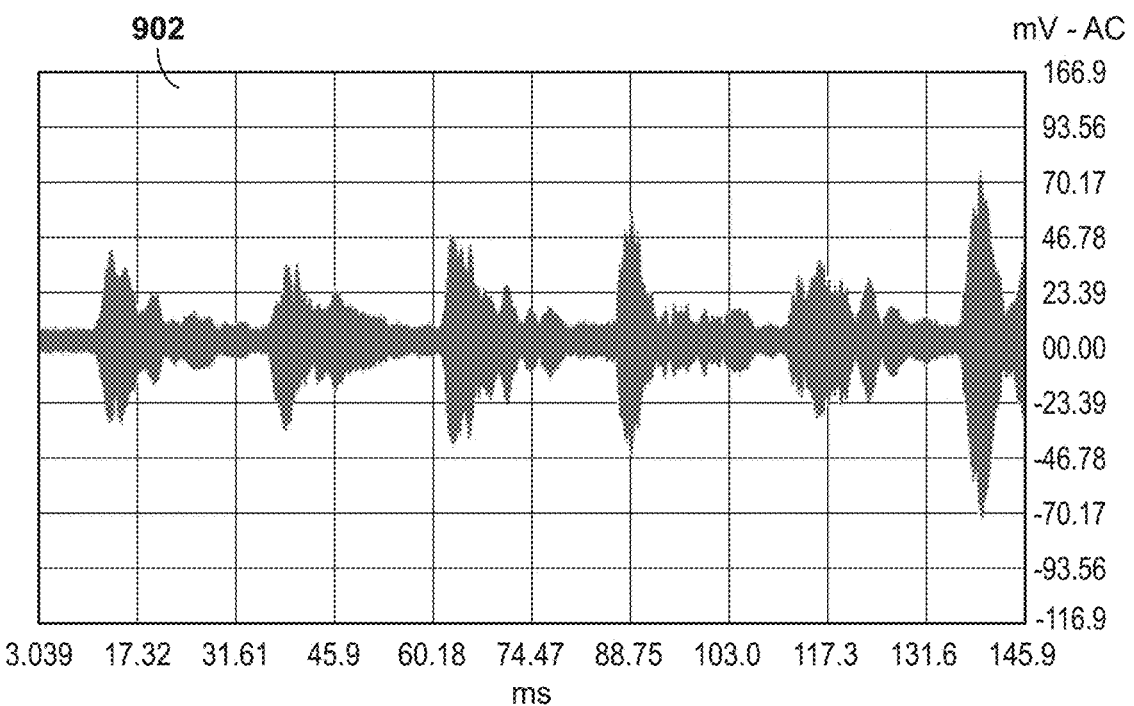
FIGS. 9A-9F are amplitude diagrams showing unique patterns or signatures of a received signal.
Figure 9B:
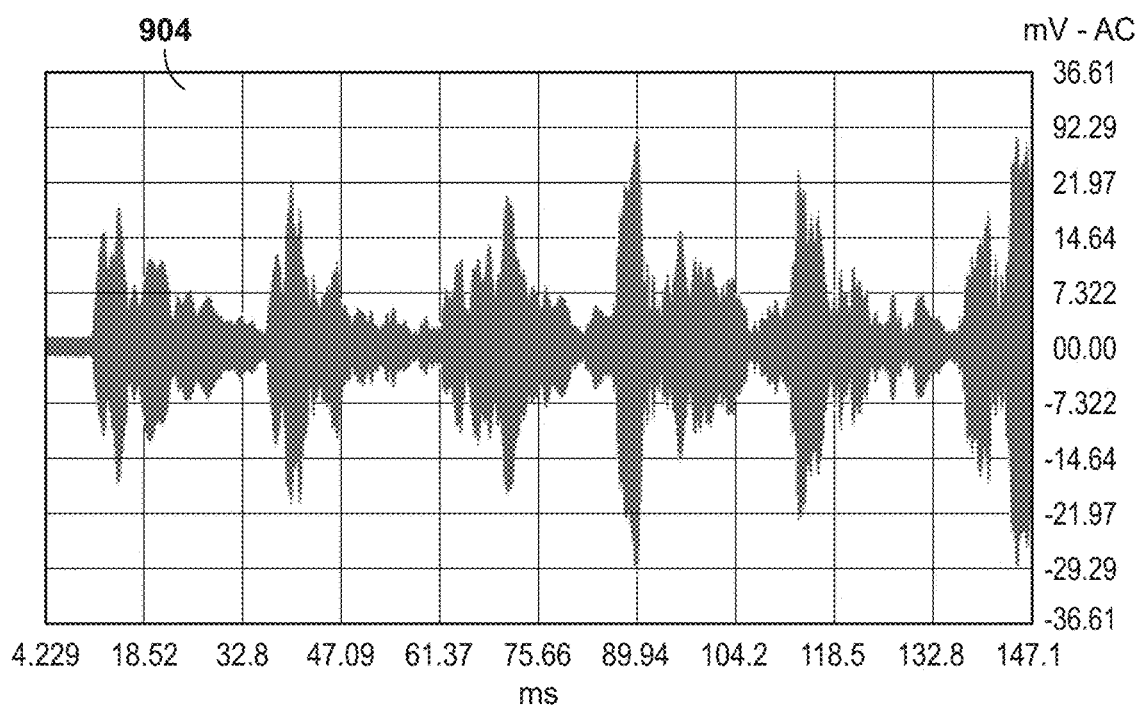
Figure 9C:
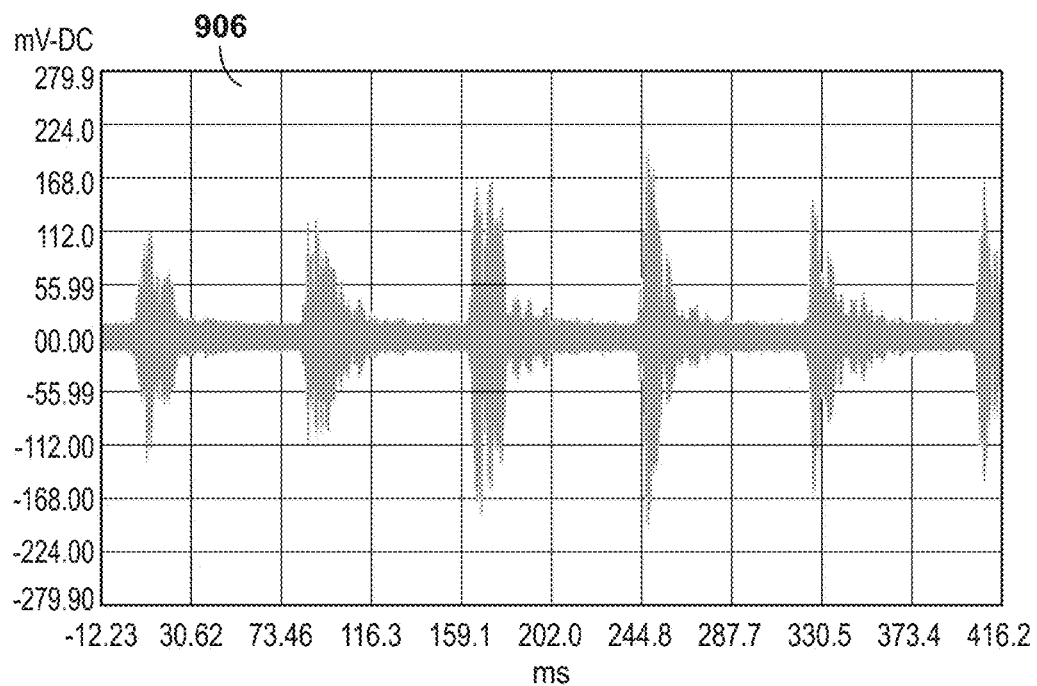
Figure 9D:
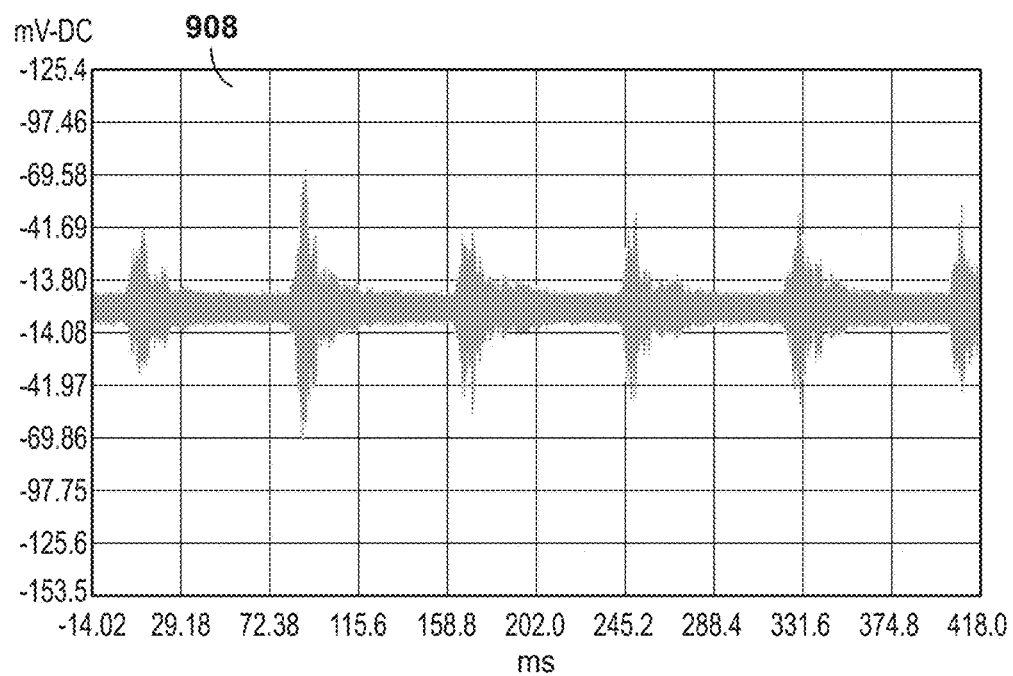
Figure 9E:
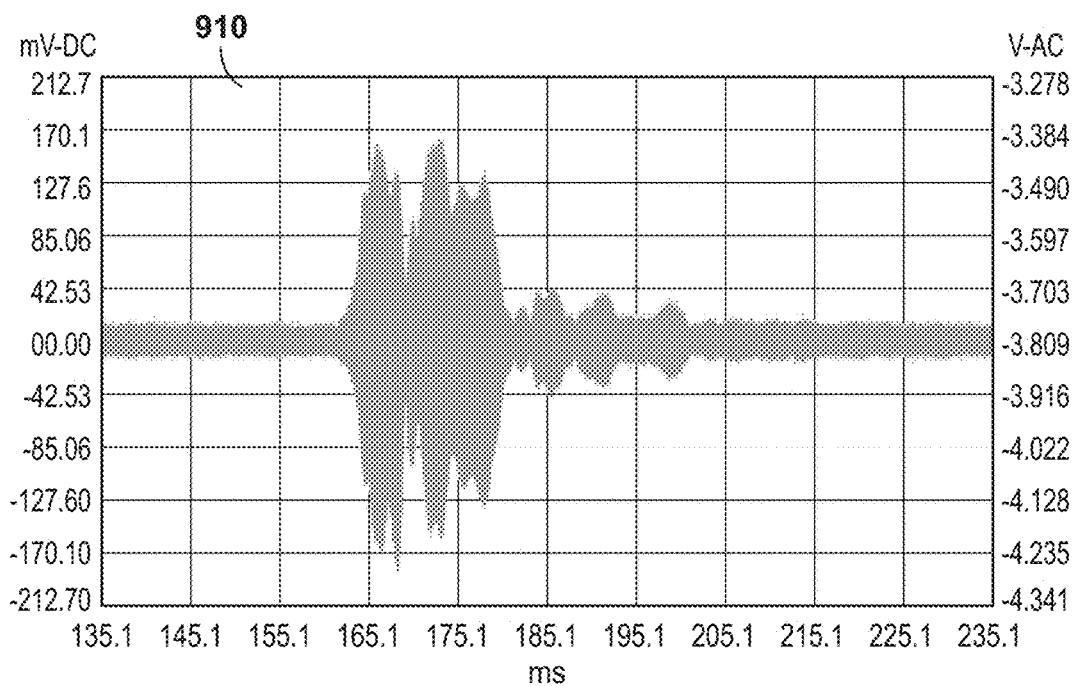
Figure 9F:
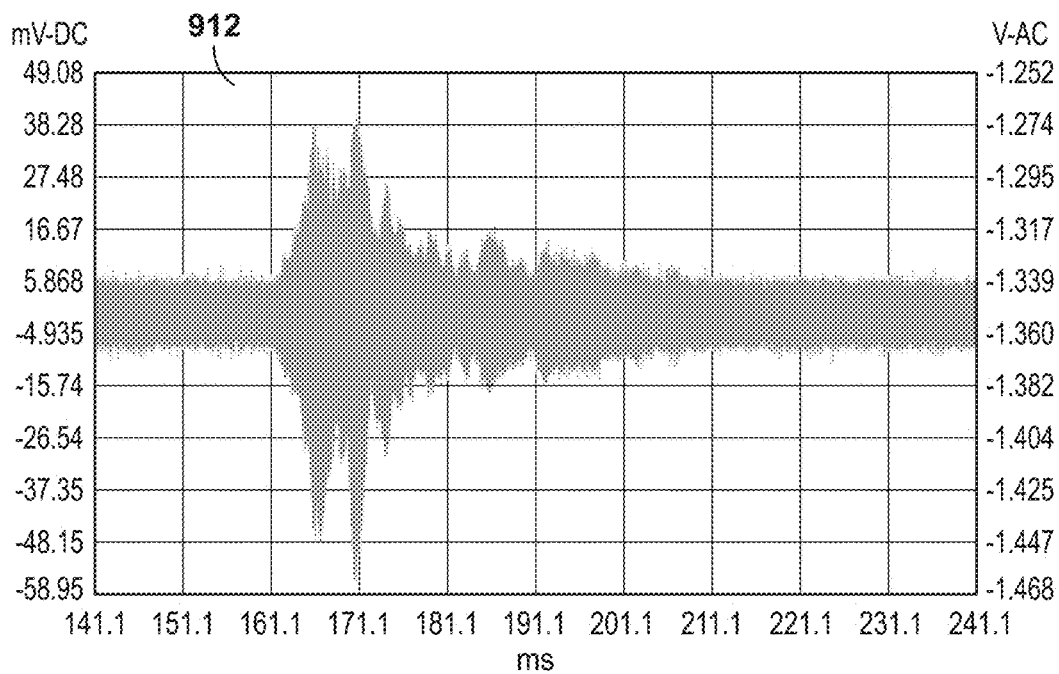

The unique patterns or signatures are present not only in the time or frequency domains, as viewable by the corresponding polyhistogram, but also in the amplitude domain, as shown by FIGS. 9A-9F, due to the physical propagation of various acoustic modes through the specific arrangement of distances and material properties (density, refraction index, etc.) unique to the transmit/receiver pair of nodes. FIG. 9A shows the time-based amplitude 902 of an acoustic signal from a transmitting node as received by a first receiving node. Both nodes are part of an acoustic wireless network associated with a wellbore and are attached to a casing of the wellbore. The first receiving node is positioned inches (centimeters) from the transmitting node, but on the opposite side of the casing, i.e., 180 degrees around the casing. FIG. 9B shows the time-based amplitude 904 of the identical signal as it is received by a second receiving node. The second receiving node is positioned inches (centimeters) from the transmitting node, but on the same side of the casing. FIG. 9C shows the time-based amplitude 906 of the signal as it is received by a third receiving node. The third receiving node is positioned 40 feet (13 meters) from the transmitting node, but on the opposite side of the casing, i.e., 180 degrees around the casing. FIG. 9D shows the time-based amplitude 908 of the signal as it is received by a fourth receiving node, which is positioned 40 feet (13 meters) from the transmitting node, but on the same side of the casing. It can be seen that a signal is received differently based on distance and position of a receiving node from a transmitting node. Another example is shown in FIGS. 9E and 9F, which depict time-based amplitudes 910, 912 of a different signal as received by the third and fourth receiving nodes, respectively.

Because the received patterns or signatures—whether in the time, frequency, or amplitude domains—are unique and repeatable for an extended duration between a given transmit/receive set of nodes, multiple uses for the patterns or signatures can be derived. Additionally, the unique received patterns or signatures are receiver-specific. In other words, a signal from a first transmit/receive node to a second transmit/receive node will generate a pattern or signature that is different from a pattern or signature generated by a signal from the second transmit/receive node to the first transmit/receive node. The unique nature of the patterns or signatures may be used to infer physical properties between two nodes.

Examples of uses of the disclosed aspects include using the unique frequency and/or amplitude signatures defining links between signals defined between the various nodes to form a network independent of human intervention. The unique frequency and/or amplitude signatures can identify specific nodes, and the network may be established using the defined nodes. Such a network may adapt over time, and be optimized on a packet-by-packet basis, either to changing physical environment, or by a specific goal for network use, such as minimizing energy usage between nodes or the network as a whole, maximizing a data rate, minimizing an error rate, minimizing latency, guaranteeing a worst-case data rate, guaranteeing a worst-case latency, autonomously balancing energy usage across multiple nodes, autonomously balancing data transmission loads, and the like. The signatures may also be used to infer physical properties between any two nodes, such as a changing nature of the transmission medium, which in an aspect may be an acoustic transmission medium. In another aspect, the unique signals may help determine, on a case-by-case basis, the networking to parameters between each node in the network. Such parameters may include locally-ideal frequency bands or timing parameters, which may be tailored specifically for a particular neighboring node that may be different from other nodes in the region, as described in commonly-owned U.S. patent application Ser. No. 16/139,427, which is incorporated by reference herein in its entirety.

In another aspect, a node may change its preferred communication partner to another node in response (at least in part) to changes noted in the acoustic and/or frequency signatures. Additionally or alternatively, a node may change one or more of its communication parameters in response (at least in part) to changes noted in the signatures. Such communication parameters may include ping time (i.e., the actual duration a signal is transmitted), wait time (i.e., a predetermined duration after a ping time where no signal is transmitted), symbol time (i.e., a duration equal to the sum of the ping time and its associated wait time), transmit amplitude, type of error correction, bits per tone, type of data compression, communication link prioritization, communication frequency band, modulation strategy, and the like. These communication parameters may be selected for communication between two nodes, a group of nodes, or all nodes in the network.

In still another aspect, a communication link and/or a network parameter may be changed or modified because the frequency signature and/or the amplitude signature of a received signal is not as expected. For example, a pair of nodes may be transmitting and receiving a series of signals. If one of the received signals, expected from or assumed to have been sent from the receiving node, has a frequency signature and/or an amplitude signature that is not in line with previously received signals from the receiving node, then the receiving node may change or modify the communication link and/or network parameter(s) to maintain or improve communication between the nodes and in the network overall.

In an additional aspect, the frequency signature and/or the amplitude signature of a received signal may be used to establish a preferred signal traversal path along part or all of the network in terms of acoustic strength—instead of proximity. Such preferred signal path may include various communication links and communication parameters at different locations along the network.

In still another aspect of the disclosure, the frequency signature and/or the amplitude signature of a received signal, once identified as being from a specific transmitting node in the network, may itself be used as a unique identifier of the transmitting node. In this case, the transmitting node does not need to include a node identifier in the message or data being to transmitted by the signal; the signature is sufficient to identify the transmitting node. The signal can therefore be used to transmit actual information, thereby saving transmission power and time.

Changes in the physical properties of received signals over time may be noted by recording in memory the pattern changes over time. Such recorded signal changes may be caused by and therefore used to determine changes in the physical surroundings such as the contents of the wellbore tubular, rate of flow or flow regime of the contents, corrosion, perforation or other tubular failure, changes in tubular thickness or eccentricity, potential wellbore blockages, and the like. Changes in the signal over time may also be the result of node hardware failures or declining battery power. Recording and analyzing the changes in signal properties over time may permit one to predict and mitigate node failures.

The unique frequency/amplitude signatures of each node connection are affected by their surroundings in the wellbore. By analyzing these signatures, it may be possible to determine which node is most proximate to a condition of interest to be sensed using a node's onboard sensors. Such condition of interest may include a well perforation, a well inflow, a wellbore blockage, a re-injection operation, a location of a wired or autonomous tool in the well, and the like.

Advantages of the disclosed aspects are numerous. For example, node identification and network assembly can occur without human intervention. Determination of neighboring nodes may occur in terms of optimal acoustic strength instead of physical proximity. This allows for automated assignment of non-sequential node identifications at the time of manufacture, and the nodes may then be installed on the casing in arbitrary order but tracked for physical location using barcode scans, RFID tags, etc. during installation into the well). Other neighbor pairings may be optimized on a packet-by-packet basis based on another goal such as lowest energy usage, highest data (lowest error) rate, lowest latency, autonomous load balancing, etc.

Another advantage is that dynamic optimization of networking parameters and optimal communication partners may be performed on a case-by-case basis. Such optimization increases network scalability, thereby supporting operation of a larger network such as in deeper wells. For example, a neighboring node's transmission characteristics may suggest that, at a particular moment, the neighbor is unsuitable for conveying an important or large packet.

Another advantage is that with extremely sensitive dynamic systems, changes in the physical properties of received signals over time may be noted by recording in memory the pattern changes over time. Still another advantage is that locally-ideal frequency bands or timing parameters can be tailored specifically for a particular neighboring node that may be different from other nodes in the region, as described in commonly-owned U.S. patent application Ser. No. 16/139,427, "Method and System for Performing Operations with Communications" and filed Oct. 13, 2017, the disclosure of which is incorporated by reference herein in its entirety.

Still another advantage is that the disclosed wireless acoustic network can issue predictive trouble tickets that focus operator intervention on high-risk nodes. Yet another advantage is that the disclosed wireless acoustic network can determine which node is most proximate to a condition of interest to be sensed using a node's onboard sensors.

Figure 10:
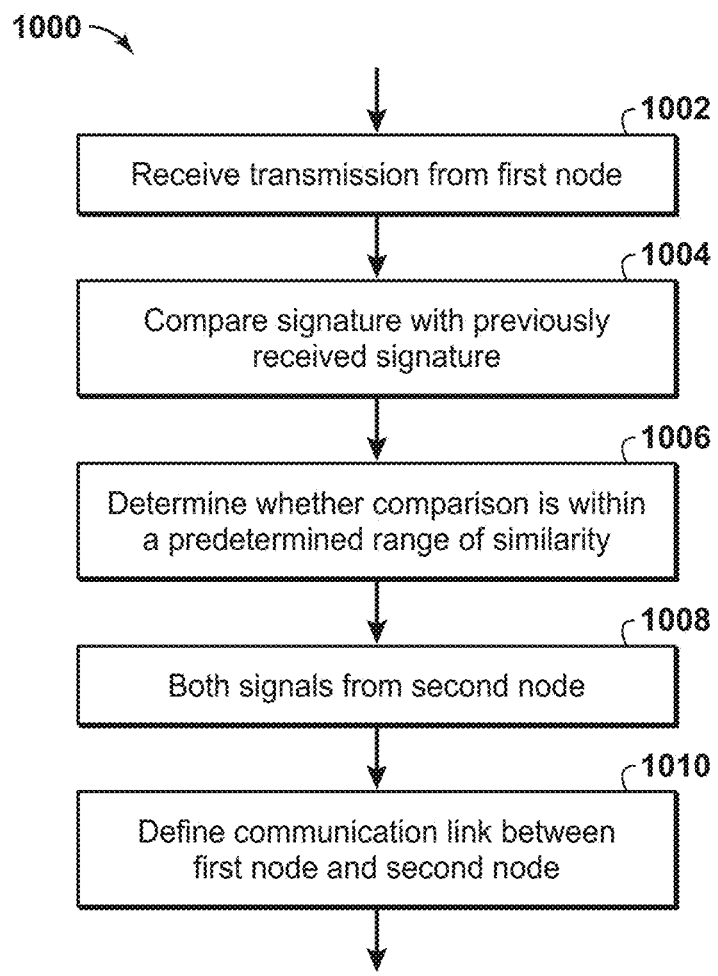
FIG. 10 is a flowchart depicting a method of using acoustic tonal signatures as method of network peer identification and self-organization in an acoustic wireless network.

FIG. 10 is a flowchart depicting a method 1000 of communicating using a wireless network according to the present disclosure. The wireless network may be an acoustic wireless network having a tone transmission medium. At block 1002 a wireless transmission of a signal is received at a first node, where the received signal has a frequency signature and/or an amplitude signature. At block 1004 the frequency signature and/or the amplitude signature of the received signal is compared with a frequency signature and/or an amplitude signature of a previously received signal received from a second node. At block 1006 it is determined whether the frequency signature and/or the amplitude signature of the received signal and the frequency signature and/or the amplitude signature of the previously received signal are within a predetermined range of similarity. If so, at block 1008 the received signal and the previously received signal are accepted as having been transmitted by the second node. At block 1010 the received signal and the previously received signal are defined as identifying a communication link between the first node and the second node.

The acoustic wireless network and/or the nodes thereof, which are disclosed herein, including acoustic wireless network 50 and/or nodes 60 of FIG. 1, may include and/or be any suitable structure, device, and/or devices that may be adapted, configured, designed, constructed, and/or programmed to perform the functions discussed herein with reference to any of the methods disclosed herein. As examples, the acoustic wireless network and/or the associated nodes may include one or more of an electronic controller, a dedicated controller, a special-purpose controller, a special-purpose computer, a display device, a logic device, a memory device, and/or a memory device having computer-readable storage media.

The computer-readable storage media, when present, also may be referred to herein as non-transitory computer readable storage media. This non-transitory computer readable storage media may include, define, house, and/or store computer-executable instructions, programs, and/or code; and these computer-executable instructions may direct the acoustic wireless network and/or the nodes thereof to perform any suitable portion, or subset, of any of the methods disclosed herein. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

INDUSTRIAL APPLICABILITY

The wells and methods disclosed herein are applicable to the acoustic wireless communication, to the hydrocarbon exploration, and/or to the hydrocarbon production industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of communication using a wireless network, comprising: preceding
   at a first node, receiving a wireless transmission of a signal, the received signal having a frequency signature and/or an amplitude signature;
   comparing the frequency signature and/or the amplitude signature of the received signal with a frequency signature and/or an amplitude signature of a previously received signal from a second node; and
   if the frequency signature and/or the amplitude signature of the received signal and the frequency signature and/or the amplitude signature of the previously received signal are within a predetermined range of similarity, accepting the received signal and the previously received signal as having been transmitted by the second node and defining the received signal and the previously received signal as a unique signal identifying a communication link between the first node and the second node;
   wherein the receiving step comprises receiving, with a decoding node of an acoustic wireless network and from the tone transmission medium, a received acoustic tone for a tone receipt time, and wherein the comparing step comprises:
   estimating a frequency of the received acoustic tone, as a function of time, during the tone receipt time, wherein the estimating includes estimating a plurality of discrete frequency values received at a corresponding plurality of discrete times within the tone receipt time;
   separating the tone receipt time into a plurality of time intervals, wherein each time interval in the plurality of time intervals includes a subset of the plurality of discrete frequency values received during the time interval;
   calculating a frequency variation within each subset of the plurality of discrete frequency values;
   selecting a subset of the plurality of time intervals within which the frequency variation is less than a threshold frequency variation; and
   averaging the plurality of discrete frequency values within the subset of the plurality of time intervals to determine major frequency of the received acoustic tone.

2. The method of claim 1, further comprising:
using the unique signal, forming the wireless network independent of user intervention.

3. The method of claim 1, further comprising:
using the unique signal, adapting a connection in the wireless network.

4. The method of claim 3, wherein adapting the connection comprises adapting the connection due to a changing physical environment.

5. The method of claim 3, wherein adapting the connection comprises adapting the connection to optimize network communications.

6. The method of claim 5, wherein optimizing network communications comprises at least one of minimizing energy usage in the wireless network, minimizing error rate, maximizing data rate, minimizing latency, guaranteeing a worst-case data rate, guaranteeing a worst-case latency, autonomously balancing energy usage across multiple nodes, and autonomously balancing data transmission loads.

7. The method of claim 1, further comprising:
inferring physical properties between the first node and the second node based on one or more of
the frequency signature and/or the amplitude signature of the received signal from the first node, and
the frequency signature and/or the amplitude signature of the received signal from the second node.

8. The method of claim 1, further comprising:
recording, in a memory, changes to the frequency signature and/or the amplitude signature of subsequently received signals at the first node.

9. The method of claim 1, further comprising:
using at least one of the frequency signature and/or the amplitude signature of the received signal and the frequency signature and/or the amplitude signature of the previously received signal, determining a node in the wireless network most proximate to a condition of interest; and
sensing the condition of interest using sensors associated with the determined node.

10. The method of claim 1, further comprising:
when the frequency signature and/or the amplitude signature of an expected received signal and the frequency signature and/or the amplitude signature of the previously received signal are not within a predetermined range of similarity, establishing a second communication link between
one of the first node and the second node, and
a third node,
prioritizing use of the second communication link over the first communication link.

11. The method of claim 1, further comprising:
when the frequency signature and/or the amplitude signature of an expected received signal and the frequency signature and/or the amplitude signature of the previously received signal are not within a predetermined range of similarity, modifying one or more communication parameters of the communication link.

12. The method of claim 11, wherein the one or more communication parameters comprise ping time, wait time, symbol time, transmit amplitude, error correction type, bits per tone, type of data compression, communication link prioritization, communication frequency band, and modulation strategy.

13. The method of claim 1, further comprising:
identifying, from one of
the frequency signature and/or the amplitude signature of the received signal and
the frequency signature and/or the amplitude signature of the previously received signal
a risk to the communication link; and
transmitting, from one of the first node and the second node, a message to a third node or to a user of the wireless communication network regarding the identified risk.

14. The method of claim 1, wherein the wireless network is an acoustic wireless network having a tone transmission medium.

15. The method of claim 1, further comprising:
establishing a preferred path of signal traversal along the network in terms of optimal acoustic strength based at least in part on one or more of
the frequency signature and/or the amplitude signature of the received signal from the first node, and
the frequency signature and/or the amplitude signature of the received signal from the second node.

16. The method of claim 1, further comprising:
using the unique signal as a replacement for an encoded node identifier in the received signal.

17. A well, comprising:
a wellbore that extends within a subterranean formation; and
a downhole acoustic wireless network including a plurality of nodes spaced-apart along a length of the wellbore, wherein the plurality of nodes includes a decoding node;
a processor; and
non-transitory computer readable storage media including computer-executable instructions that, when executed on the processor, direct the downhole acoustic wireless network to perform a process of communication therewith, the process including:
at a first node of the plurality of nodes, receiving a wireless transmission of a signal, the received signal having a frequency signature and/or an amplitude signature;
comparing the frequency signature and/or the amplitude signature of the received signal with a frequency signature and/or an amplitude signature of a previously received signal from a second node of the plurality of nodes; and
if the frequency signature and/or the amplitude signature of the received signal and the frequency signature and/or the amplitude signature of the previously received signal are within a predetermined range of similarity, accepting the received signal and the previously received signal as having been transmitted by the second node and defining the received signal and the previously received signal as a unique signal identifying a communication link between the first node and the second node;
wherein the receiving step comprises receiving, with the decoding node of an acoustic wireless network and from the tone transmission medium, a received acoustic tone for a tone receipt time, and wherein the comparing step comprises:
estimating a frequency of the received acoustic tone, as a function of time, during the tone receipt time, wherein the estimating includes estimating a plurality of discrete frequency values received at a corresponding plurality of discrete times within the tone receipt time;
separating the tone receipt time into a plurality of time intervals, wherein each time interval in the plurality of time intervals includes a subset of the plurality of discrete frequency values received during the time interval;

calculating a frequency variation within each subset of the plurality of discrete frequency values;

selecting a subset of the plurality of time intervals within which the frequency variation is less than a threshold frequency variation; and averaging the plurality of discrete frequency values within the subset of the plurality of time intervals to determine major frequency of the received acoustic tone.

18. Non-transitory computer readable storage media including computer-executable instructions that, when executed on a processor, direct an acoustic wireless network to perform a process of communication using a wireless network, comprising:

at a first node, receiving a wireless transmission of a signal, the received signal having a frequency signature and/or an amplitude signature;

comparing the frequency signature and/or the amplitude signature of the received signal with a frequency signature and/or an amplitude signature of a previously received signal from a second node; and if the frequency signature and/or the amplitude signature of the received signal and the frequency signature and/or the amplitude signature of the previously received signal are within a predetermined range of similarity, accepting the received signal and the previously received signal as having been transmitted by the second node and defining the received signal and the previously received signal as a unique signal identifying a communication link between the first node and the second node;

wherein the receiving step comprises receiving, with a decoding node of an acoustic wireless network and from the tone transmission medium, a received acoustic tone for a tone receipt time, and wherein the comparing step comprises:

estimating a frequency of the received acoustic tone, as a function of time, during the tone receipt time, wherein the estimating includes estimating a plurality of discrete frequency values received at a corresponding plurality of discrete times within the tone receipt time;

separating the tone receipt time into a plurality of time intervals, wherein each time interval in the plurality of time intervals includes a subset of the plurality of discrete frequency values received during the time interval;

calculating a frequency variation within each subset of the plurality of discrete frequency values;

selecting a subset of the plurality of time intervals within which the frequency variation is less than a threshold frequency variation; and averaging the plurality of discrete frequency values within the subset of the plurality of time intervals to determine major frequency of the received acoustic tone.

* * * * *